United States Patent
Orille

(10) Patent No.: US 11,566,556 B2
(45) Date of Patent: Jan. 31, 2023

(54) EXHAUST LINING HAVING A CONNECTING ELEMENT

(71) Applicant: Cisma Solutions ApS, Silkeborg (DK)

(72) Inventor: Angel Orille, Horb am Neckar (DE)

(73) Assignee: Cisma Solutions ApS, Silkeborg (DK)

( * ) Notice: Subject to any disclaimer, the term of this patent is extended or adjusted under 35 U.S.C. 154(b) by 483 days.

(21) Appl. No.: 16/454,028

(22) Filed: Jun. 26, 2019

(65) Prior Publication Data

US 2019/0316511 A1  Oct. 17, 2019

Related U.S. Application Data

(63) Continuation of application No. PCT/EP2018/059688, filed on Apr. 16, 2018.

(51) Int. Cl.
| | |
|---|---|
| *F01N 13/18* | (2010.01) |
| *F01N 13/08* | (2010.01) |
| *F01N 13/20* | (2010.01) |
| *F16L 9/128* | (2006.01) |
| *F16L 37/08* | (2006.01) |

(52) U.S. Cl.
CPC ....... *F01N 13/1805* (2013.01); *F01N 13/082* (2013.01); *F01N 13/1811* (2013.01); *F01N 13/1838* (2013.01); *F01N 13/1844* (2013.01); *F01N 13/20* (2013.01); *F16L 9/128* (2013.01); *F16L 37/082* (2013.01)

(58) Field of Classification Search
CPC ............... F01N 13/082; F01N 13/1805; F01N 13/1811; F01N 13/1838; F01N 13/1844; F01N 13/20; F16L 9/128; F16L 37/082
See application file for complete search history.

(56) References Cited

U.S. PATENT DOCUMENTS

| 2004/0084247 A1* | 5/2004 | Kishida ................... F01N 13/08 181/227 |
| 2017/0009637 A1* | 1/2017 | Schwarz ............... F01N 13/082 |
| 2017/0022874 A1* | 1/2017 | Laursen ................ F16L 37/082 |

FOREIGN PATENT DOCUMENTS

| CN | 202402119 U | 8/2012 |
| DE | 196 51 608 A1 | 6/1998 |
| DE | 102 33 498 A1 | 1/2004 |
| DE | 10 2013 017947 A1 | 5/2015 |
| DE | 20 2015 103869 U1 | 11/2015 |
| DE | 11 2015 000 497 T5 | 11/2016 |
| WO | 2014/081377 A1 | 5/2014 |

* cited by examiner

*Primary Examiner* — Audrey B. Walter
(74) *Attorney, Agent, or Firm* — Hackler Daghighian Martino & Novak

(57) ABSTRACT

An exhaust lining for an exhaust system of a motor vehicle has a first connecting element clamped between a first and second pipe. The first pipe forms a tailpipe. The second pipe forms a tailpipe cover. The tailpipe cover has a tubular inner part held on by means of the first connecting element which clings onto the first pipe via by means of a lever mechanism. A load arm of the lever mechanism, having the distance A, is shorter than an effort arm, having the distance B. The length of the effort arm is precisely defined, because the end of the effort arm lies against the first pipe via a punctiform contact area. A first contact surface of a clamping spring is designed offset from the longitudinal extent of a main body of the first connecting element to save space in the longitudinal direction of the main body.

13 Claims, 4 Drawing Sheets

EXHAUST LINING HAVING A CONNECTING ELEMENT

CROSS-REFERENCE TO RELATED APPLICATIONS

This continuation application claims priority to PCT/EP2018/059688 filed on Apr. 16, 2018 which has published as WO 2018/192883 A1 and also the German application number 10 2017 206 750.0 filed on Apr. 21, 2017, the entire contents of which are fully incorporated herein with these references.

DESCRIPTION

Field of the Invention

The invention relates to an exhaust lining for a motor vehicle, the exhaust lining comprising: a) a first pipe; b) a second pipe; and c) an at least partially resilient one-piece first connecting element disposed radially between the first pipe and the second pipe for holding the second pipe to the first pipe.

Background of the Invention

It is known to use previously described exhaust linings on motor vehicles to determine the appearance and acoustics of an exhaust system. However, the connecting elements used in the prior art for attachment of the second pipe to the first pipe are insufficient to hold the second pipe reliably against the first pipe even with large temperature and manufacturing fluctuations.

DE 20 2015 103 869 U1 describes a tailpipe mounting system for mounting a tailpipe to the end of a tailpipe, the mounting system comprising a spring assembly of at least three spring elements that can be secured to the tailpipe, each spring element being bent into a wave shape. At a distal end of the spring elements, in each case a gripping part is formed having at least one cutout for forming at least two pointed ends. A first and a second downwards wave part of the wave-shaped spring elements each have a horizontal spring part.

DE 11 2015 000 497 T5 discloses a tailpipe for an exhaust pipe of a vehicle comprising a pipe body, a plurality of tension spring leaves and a plurality of self-locking spring leaves. The pipe body has an inlet end to be placed on an outer wall of a foot end of the tailpipe. The plurality of tension spring leaves are disposed on an inner wall of the pipe body, each of the tension spring leaves having a fastening portion fixed to the inner wall of the pipe body and a tension portion for lying against an outer wall of the tailpipe. At the interface between a bending section and the clamping section, the tension spring leaf can have a recess in order to increase the supporting force. Similarly, at the interface between the clamping portion and a claw portion, a recess may be provided to increase the gripping force.

SUMMARY OF THE INVENTION

The object of the present invention is therefore to provide an exhaust lining as described above, which allows a reliable holding of the second pipe against the first pipe when there are large temperature and manufacturing variations.

This object is achieved according to the invention by an exhaust lining according to claim 1. The dependent claims represent preferred developments.

The object of the invention is thus achieved by an exhaust lining for a motor vehicle. The exhaust lining has a first pipe and a second pipe. Furthermore, the exhaust lining has a connecting element which is at least partially elastic. The connecting element is arranged between the first pipe and the second pipe and serves to connect the second pipe to the first pipe. The first connecting element is arranged via an end claw on the first pipe. Furthermore, the first connecting element is arranged via a punctiform contact area on the first pipe. There is a radial distance between the connecting element and the first pipe between the end claw and the punctiform contact area.

In contrast to the prior art, a punctiform contact area is now provided. The punctiform contact area allows a very defined support of the first connecting element on the first pipe. By contrast, if the first connecting element were supported by a linear or planar contact area on the first pipe, the support would be carried out in an undefined manner, depending on the temperature and the manufacturing tolerance of the exhaust lining. Even slight fluctuations, in particular the temperature, vary the actual contact region of the first connecting element on the first pipe in the case of a linear or planar contact area.

A punctiform contact area may be understood to mean a contact area whose dimensions are smaller than 1 $mm^2$, in particular smaller than 0.25 $mm^2$, preferably less than 0.1 $mm^2$.

The first pipe and/or the second pipe are/is not necessarily cylindrical. The first pipe and/or the second pipe may have a free-form geometry.

The punctiform contact area is preferably achieved by a straight kink in the first connecting element that lies against the curved surface of the first pipe.

The first connecting element may be manufactured particularly cost-effectively if it is designed in the form of a sheet-metal strip with multiple kinks and/or folds.

The second pipe may be arranged radially within the first pipe. Preferably, the first pipe is arranged radially inside the second pipe, so that the first connecting element lies radially against the first pipe to the inside via the end claw and the punctiform contact area.

In a further preferred embodiment of the exhaust lining, the first pipe is designed in the form of a tailpipe and the second pipe is designed in the form of a tailpipe cover.

The connecting element may have a projection that—with respect to the first pipe—is radially opposite the end claw and the punctiform contact area and via which the first connecting element lies against the second pipe in the form of a rocker. Via the mount in the form of a rocker, the force may be defined with which the end claw presses on the first pipe.

The projection preferably lies against the second pipe via two punctiform contact areas.

Preferably, the distance or lever arm between the projection and the punctiform contact area is greater than the distance or lever arm between the end claw and the projection. As a result, a lever force acts on the end claw and thereby locks the first connecting element on the first pipe particularly securely. The distance between the projection and the punctiform contact area preferably corresponds to at least 1.5 times the distance between the end claw and the projection. Further preferred, the distance ratio described above is >2, in particular >3, preferably >4. The end claw may have two finger projections. The claw is designed in the form of a fork with two prongs.

For further locking of the first connecting element, this connecting element may have a clamping spring in the region of the end opposite the end claw. The clamping spring is preferably tensioned radially between the first pipe and the second pipe.

The height of the clamping spring measured in the radial direction of the first pipe preferably exceeds the maximum radial height of the first connecting element between the end claw and the projection in the relaxed, unassembled state of the first connecting element. As a result, the first connecting element is firmly clamped between the first pipe and the second pipe.

The clamping spring may have a first contact surface lying against the first pipe and a second contact surface lying against the second pipe. The first contact surface cannot be designed offset relative to the second contact surface with respect to the circumferential direction of the first pipe. Preferably, however, the first contact surface in the circumferential direction of the first pipe is formed offset to the second contact surface. As a result, space can be saved parallel to the longitudinal axis of the first pipe on the first connecting element.

Preferably, the first pipe, the second pipe and/or the first connecting element are/is formed from sheet metal. As a result, a particularly cost-effective production of the exhaust lining is achieved.

A plurality of further connecting elements can be arranged between the first pipe and the second pipe spaced apart in the circumferential direction of the first pipe. The further connecting elements are preferably formed equal to the first connecting element.

Further advantages of the invention will become apparent from the description and the drawings.

DETAILED DESCRIPTION OF THE PREFERRED EMBODIMENTS

Figure 1:
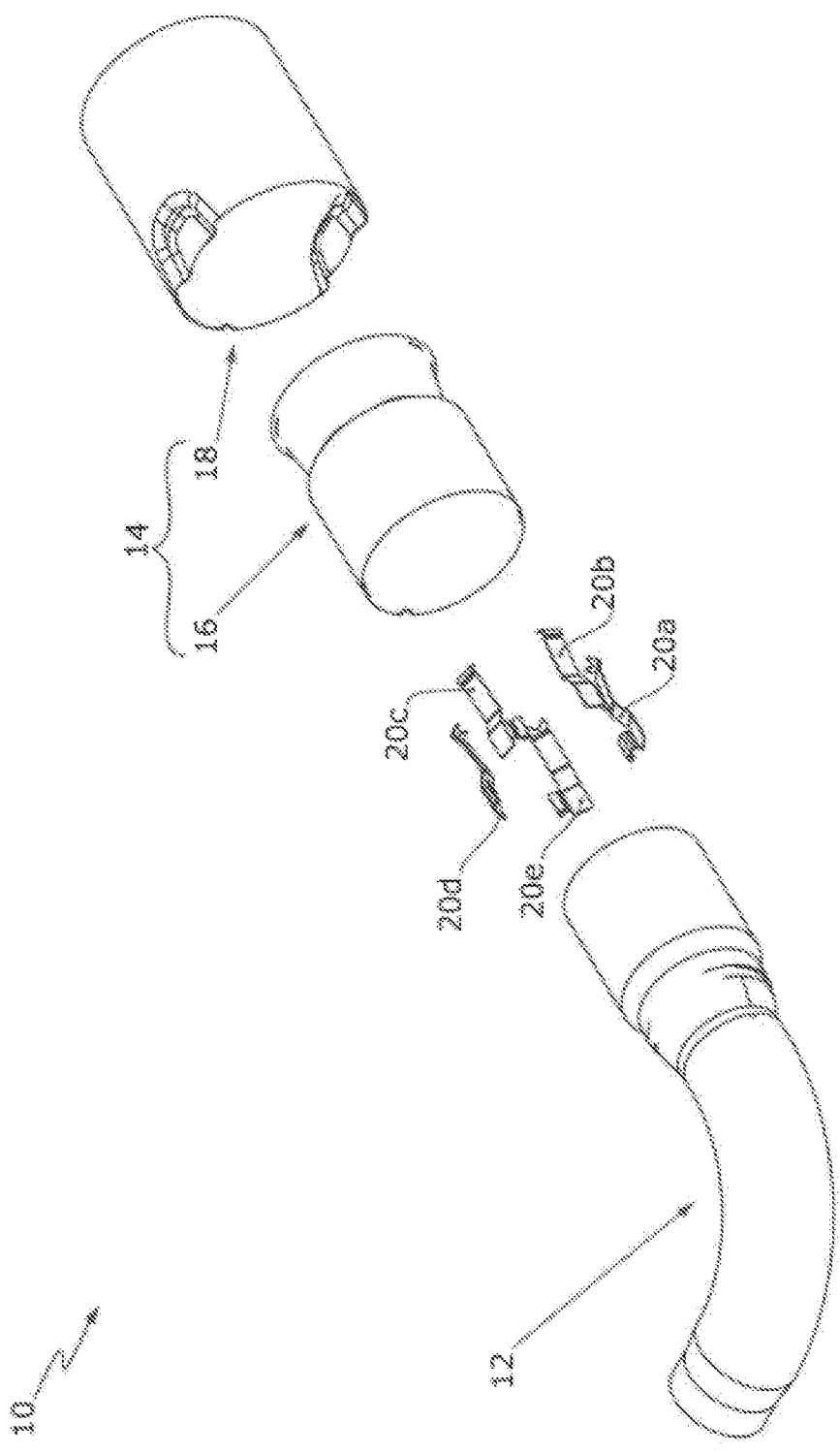
FIG. 1 is an exploded view of an exhaust lining.

FIG. 1 shows an exhaust lining 10 having a first pipe 12 and a second pipe 14. The first pipe 12 is designed in the form of a tailpipe. The second pipe 14 is designed in the form of a tailpipe cover. The second pipe 14 comprises an inner part 16 and an outer part 18. The inner part 16 is tubular. The outer part 18 is tubular. The second pipe 14, more precisely the inner part 16, is attached via at least one connecting element 20a-20e. In the present case, five fixing elements 20a-20e are provided for fixing the second pipe 14 to the first pipe 12. The outer part 18 is pushed onto the inner part 16 and thereby locked.

Figure 2:
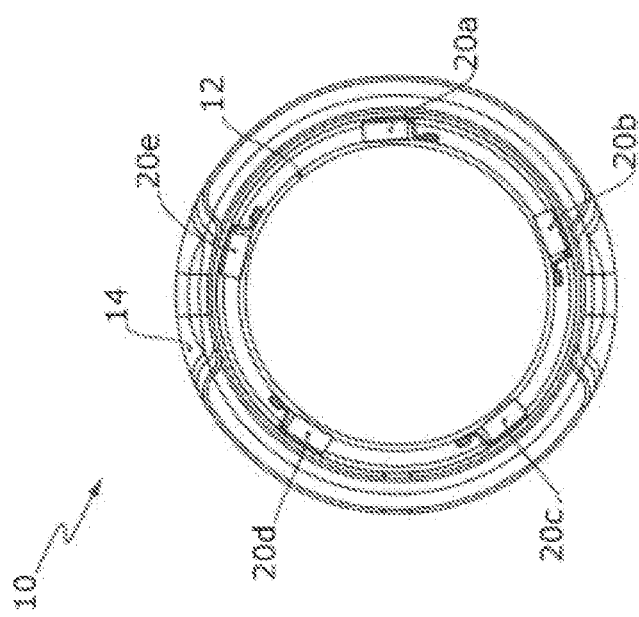
FIG. 2 is a plan view of the end-side opening of a part of the exhaust lining of FIG. 1 in the installed state.

FIG. 2 shows the exhaust lining 10 in the assembled state. From FIG. 2 it can be seen that the connecting elements 20a-20e are arranged equidistantly between the first pipe 12 and the second pipe 14 with respect to the circumferential direction of the first pipe 12 and the second pipe 14.

Figure 3:
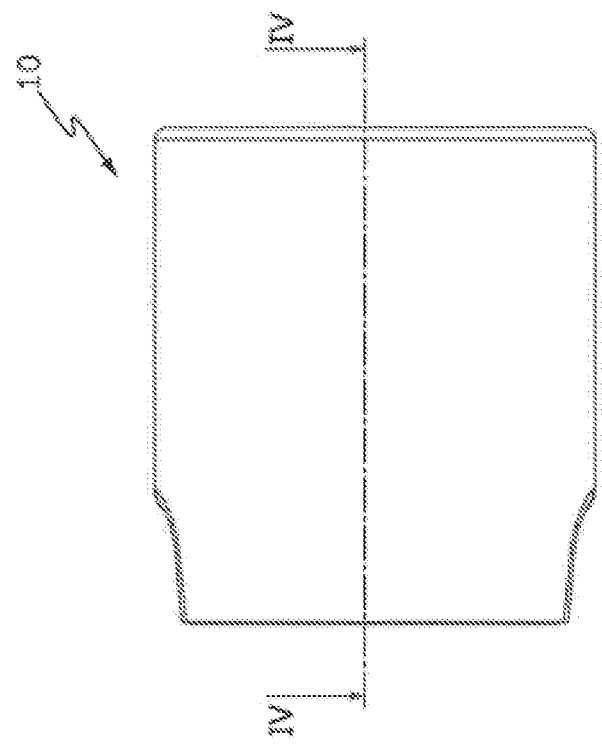
FIG. 3 is a side view of the part of the exhaust lining of FIG. 2.
Figure 4:
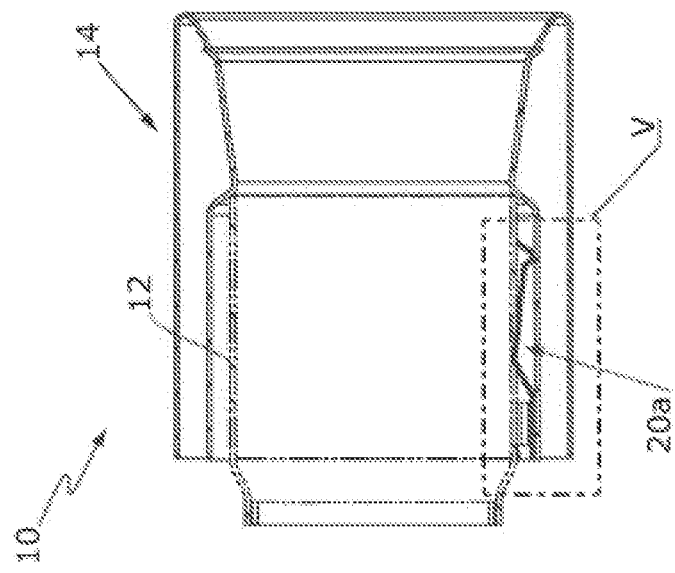
FIG. 4 is a sectional view according to the plane IV-IV from FIG. 3.

FIG. 3 shows a side view of the exhaust lining 10 for illustrating the sectional plane IV-IV of FIG. 4.

FIG. 4 shows the partial representation of the exhaust lining 10 with the first pipe 12, the second pipe 14 and the first fastening element 20a. The first fastening element 20a is at least partially, in particular completely, resilient. The first connecting element 20a is integrally formed, that is, in one piece.

Figure 5:
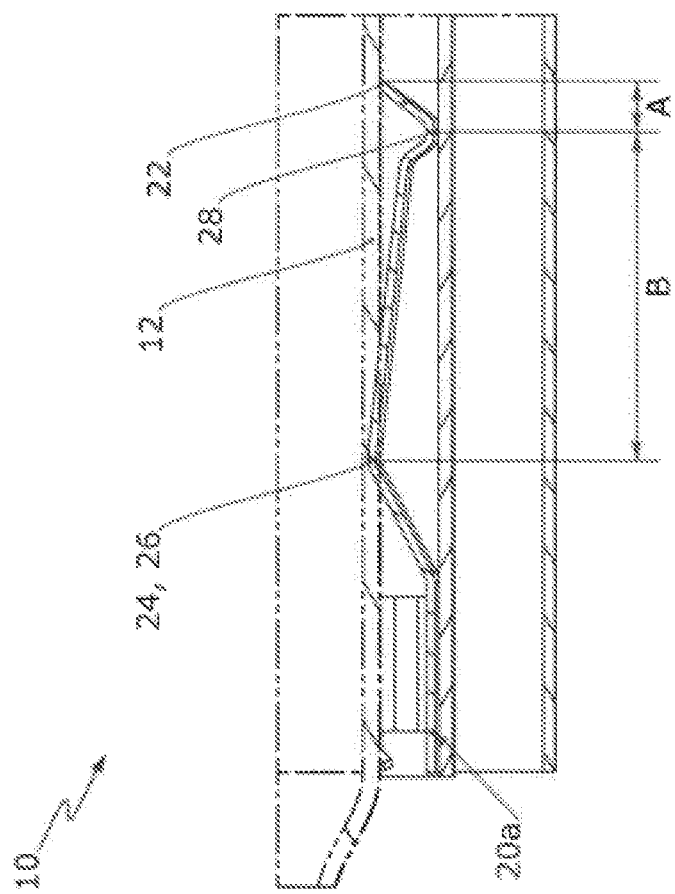
FIG. 5 shows a part of the exhaust lining according to the section V of FIG. 4.

FIG. 5 shows the detail V of the exhaust lining 10 of FIG. 4 in an enlarged view. In FIG. 5, the part of the exhaust lining 10 is visible with the first connecting element 20a. The first connecting element 20a has at one axial end an end-side claw 22, which "clings into" the first pipe 12. Furthermore, the first connecting element 20a has a punctiform contact area 24 which lies against the first pipe 12. The punctiform contact area 24 is formed by the contact of a fold 26 of the first connecting element 20a against the curvature of the first pipe 12. In particular, the straight fold 26 lies against the curved outer circumferential surface of the first pipe 12. Between the fold 26 or the punctiform contact area 24 and the end claw 22, the first connecting element 20a has a projection 28. The projection 28 forms the mounting point for a lever mechanism of the first connecting element 20a. In this case, a short load arm A between the projection 28 and the end claw 22 is formed. An effort arm B is formed between the projection 28 and the punctiform contact area 24. B is larger A. Preferably, B is more than twice A, in particular more than three times A, preferably more than four times A. As a result, the end claw 22 can be particularly firmly "clawed into" the first pipe 12.

Figure 6:
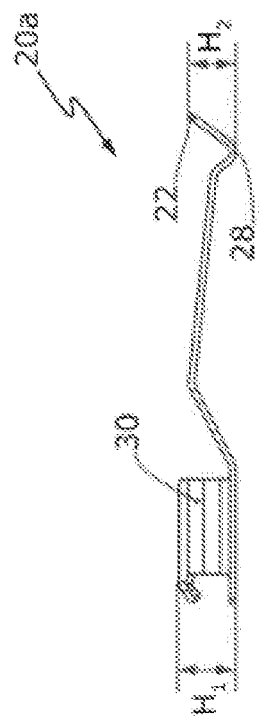
FIG. 6 is a side view of a first connecting element of the exhaust lining according to FIGS. 1 to 5.

FIG. 6 shows the first connecting element 20a alone in the unassembled, relaxed state. It can be seen from FIG. 6 that the first connecting element 20a has a clamping spring 30 at its axial end opposite the end claw 22. The radial height $H_1$ of the clamping spring 30 can exceed the radial height H2 between the end claw 22 and the projection 28. As a result, the first connecting element 22a is mounted particularly firmly between the first pipe 12 (see FIG. 4) and the second pipe 14 (see FIG. 4).

Figure 7:
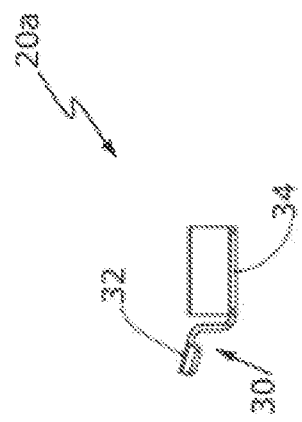
FIG. 7 is a rear view of the first connecting element from FIG. 6.

FIG. 7 shows a rear view of the first connecting element 20a. From FIG. 7 it is seen that the clamping spring 30 has a first contact surface 32 and a second contact surface 34. The second contact surface 34 is radially spaced from the first contact surface 32 with respect to the radial extent of the first pipe 12 and the second pipe 14, respectively (see FIG. 2). Furthermore, the second contact surface is spaced from the first contact surface with respect to the circumferential direction of the first pipe 12 and the second pipe 14 (see FIG. 2).

Figure 8:
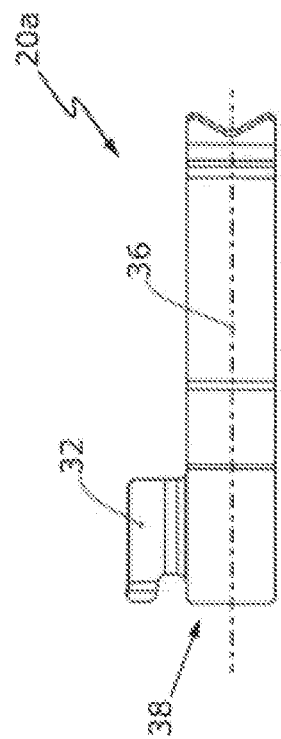
FIG. 8 is a plan view of the first connecting element according to FIGS. 6 and 7.

FIG. 8 shows a plan view of the first connecting element 20a. FIG. 8 illustrates that the first contact surface 32 is formed transversely to the longitudinal axis 36 of the main body 38 of the first connecting element 20a. In the direction of the longitudinal axis 36, the first connecting element 20a is thus designed to save space especially well.

Figure 9:
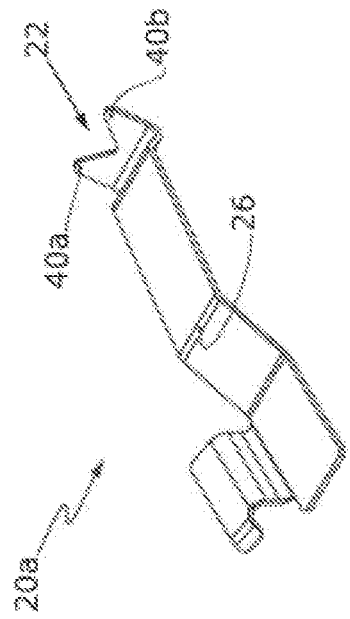
FIG. 9 is an isometric view of the first connecting element according to FIGS. 6 to 8.

FIG. 9 shows an isometric view of the first connecting element 20a. It can be seen from FIG. 9 that the end claw 22 has a plurality of finger projections 40a, 40b, in particular at least one finger projection 40a, 40b, preferably two finger projections 40a, 40b. The at least one finger projection 40a, 40b may be sharp-edged or rounded. Furthermore, FIG. 9 shows the straight, linear fold 26 of the first connecting element 20a, which forms a punctiform contact area 24 (see FIG. 5) lying against the curved outer surface of the first pipe 12 (see FIG. 5).

Considering all the figures of the drawing taken together, the invention in summary relates to an exhaust lining 10 for an exhaust system of a motor vehicle. The exhaust lining 10 has at least one first connecting element 20a, which is clamped between a first pipe 12 and a second pipe 14 of the exhaust lining 10. The first pipe 12 is preferably in the form of a tailpipe, the second pipe 14 in the form of a tailpipe cover. The tailpipe cover can have a multi-piece design. The tailpipe cover preferably has a tubular inner part 16, which is held on the tailpipe by means of the at least one first connecting element 20a. The first connecting element 20a clings onto the first pipe 12 via, i.e. by means of a lever mechanism. A load arm of the lever mechanism, having the distance A, is preferably shorter than an effort arm, having the distance B. According to the invention, the length of the effort arm is very precisely defined, because the end of the effort arm lies against the first pipe 12 via a punctiform contact area 24. A first contact surface 32 of a clamping spring 30 can be designed offset from the longitudinal extent of a main body 38 of the first connecting element 20a in order to save space in the direction of the longitudinal extent of the main body 38.

What is claimed is:

1. An exhaust lining for a motor vehicle, the exhaust lining comprising:
    a first pipe;
    a second pipe;
    wherein the first pipe is arranged radially inside the second pipe;
    an at least partially resilient one-piece first connecting element disposed radially between the first pipe and the second pipe for holding the second pipe to the first pipe;
    the first connecting element being supported on the first pipe both via an end claw of the first connecting element and via a punctiform contact area of the first connecting element, the first connecting element being formed between the contact of the end claw and the punctiform contact area at a distance along the first pipe;
    wherein the first connecting element has a clamping spring in the region of an end opposite the end claw which is tensioned radially between the first pipe and the second pipe;
    wherein the first connecting element is mounted lying against the second pipe in the form of a rocker between the end claw and the punctiform contact area via a projection of the first connecting element, wherein the projection lies against the second pipe;
    wherein the first connecting element lies against the first pipe radially inwardly via the end claw and the punctiform contact area on the first pipe;
    wherein a distance B between the projection and the punctiform contact area corresponds to at least 3 times a distance A between the end claw and the projection.

2. The exhaust lining according to claim 1, wherein the end claw has two finger projections.

3. The exhaust lining according to claim 1, wherein the first pipe, the second pipe and/or the first connecting element is/are formed of sheet metal.

4. The exhaust lining according to claim 1, wherein the clamping spring extends outwardly from the end opposite the end claw in a direction that is perpendicular to the distance along the first pipe.

5. The exhaust lining according to claim 1, wherein the distance B between the projection and the punctiform contact area corresponds to at least 4 times the distance A between the end claw and the projection.

6. The exhaust lining according to claim 1, wherein the punctiform contact area is not a linear or planar contact area.

7. The exhaust lining according to claim 1, wherein the first connecting element, the first pipe and the second pipe extend along a longitudinal axis, wherein the first connecting element extends between the projection and the punctiform contact area comprising two sections with differing angles with respect to the longitudinal axis.

8. The exhaust lining according to claim 1, wherein the first connecting element has no more than five contact points between the first and second pipes, there being three contacts with the first pipe and two contacts with the second pipe.

9. The exhaust lining according to claim 1, wherein in a circumferential direction of the first pipe further connecting elements are arranged between the first pipe and the second pipe, the further connecting elements being formed equal to the first connecting element.

10. The exhaust lining according to claim 9, wherein the first connecting element and further connecting elements are not connected together, nor connected to either the first pipe or second pipe, before being arranged between the first pipe and the second pipe.

11. The exhaust lining according to claim 1, wherein the first pipe is designed in the form of a tailpipe and the second pipe is designed in the form of a tailpipe cover.

12. The exhaust lining according to claim 11, wherein a radial height $H_1$ of the clamping spring in a relaxed, unmounted state of the first connecting element exceeds a maximum radial height $H_2$ between the end claw and the projection.

13. The exhaust lining according to claim 12, wherein the clamping spring has a first contact surface lying against the first pipe and a second contact surface lying against the second pipe, the first contact surface being formed offset from the second contact surface in a circumferential direction of the first pipe.

* * * * *

UNITED STATES PATENT AND TRADEMARK OFFICE
CERTIFICATE OF CORRECTION

| | |
|---|---|
| PATENT NO. | : 11,566,556 B2 |
| APPLICATION NO. | : 16/454028 |
| DATED | : January 31, 2023 |
| INVENTOR(S) | : Angel Orille |

It is certified that error appears in the above-identified patent and that said Letters Patent is hereby corrected as shown below:

On the Title Page

Column 1, below the Related U.S. Application Data:
Insert --Foreign Application Priority Data
Apr. 21, 2017 (DE) .................. 10 2017 206 750.0--.

Signed and Sealed this
Twenty-first Day of March, 2023

Katherine Kelly Vidal
*Director of the United States Patent and Trademark Office*